(12) United States Patent
Min et al.

(10) Patent No.: US 11,309,554 B2
(45) Date of Patent: Apr. 19, 2022

(54) METHOD AND DEVICE FOR RECYCLING ELECTROLYTE OF FLOW BATTERY

(71) Applicant: LG CHEM, LTD., Seoul (KR)

(72) Inventors: Geungi Min, Daejeon (KR); Tae Geun Noh, Daejeon (KR); Sikwon Moon, Daejeon (KR); Jeongbae Lee, Daejeon (KR); Bong Hyun Jeong, Daejeon (KR); Sujin Byun, Daejeon (KR); Sungyeon Kim, Daejeon (KR); Joon Ho Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 339 days.

(21) Appl. No.: 16/345,079

(22) PCT Filed: Feb. 9, 2018

(86) PCT No.: PCT/KR2018/001760
§ 371 (c)(1),
(2) Date: Apr. 25, 2019

(87) PCT Pub. No.: WO2018/147682
PCT Pub. Date: Aug. 16, 2018

(65) Prior Publication Data
US 2019/0280316 A1    Sep. 12, 2019

(30) Foreign Application Priority Data
Feb. 10, 2017 (KR) .................. 10-2017-0018784

(51) Int. Cl.
*H01M 8/04186* (2016.01)
*H01M 8/18* (2006.01)
(Continued)

(52) U.S. Cl.
CPC ... *H01M 8/04186* (2013.01); *H01M 8/04276* (2013.01); *H01M 8/18* (2013.01);
(Continued)

(58) Field of Classification Search
None
See application file for complete search history.

(56) References Cited

U.S. PATENT DOCUMENTS

| 4,956,244 A | 9/1990 | Shimizu et al. |
| 9,406,961 B2 | 8/2016 | Kim et al. |

(Continued)

FOREIGN PATENT DOCUMENTS

| CN | 105702997 A | 6/2016 |
| JP | 2917304 B2 | 7/1999 |

(Continued)

OTHER PUBLICATIONS

Extended European Search Report, dated Nov. 13, 2019, for European Application No. 18750797.5.

(Continued)

*Primary Examiner* — Tracy M Dove
(74) *Attorney, Agent, or Firm* — Birch, Stewart, Kolasch & Birch, LLP (57) ABSTRACT

The present invention relates to a method for regenerating an electrolyte liquid of a flow battery, and a device for regenerating an electrolyte liquid of a flow battery. The method involves operating a flow battery, stopping the operation of the flow battery, mixing the anode electrolyte liquid and the cathode electrolyte liquid of the flow battery, electrically oxidizing or reducing the mixed electrolyte liquid and dividing the oxidized or reduced electrolyte liquid into each of a cathode electrolyte liquid storage unit and a anode electrolyte liquid storage unit. The device includes a flow battery and a flow battery for regeneration.

11 Claims, 5 Drawing Sheets

(51) Int. Cl.
*H01M 50/77* (2021.01)
*H01M 8/04276* (2016.01)
*H01M 8/20* (2006.01)

(52) U.S. Cl.
CPC .............. *H01M 8/188* (2013.01); *H01M 8/20* (2013.01); *H01M 50/77* (2021.01); *Y02E 60/50* (2013.01)

(56) References Cited

U.S. PATENT DOCUMENTS

| | | |
|---|---|---|
| 2015/0017556 A1 | 1/2015 | Kim et al. |
| 2015/0104724 A1 | 4/2015 | Chang et al. |
| 2015/0226806 A1 | 8/2015 | Kim et al. |
| 2017/0155158 A1 | 6/2017 | Kim et al. |
| 2017/0271694 A1 | 9/2017 | Jeong et al. |
| 2019/0067727 A1 | 2/2019 | Esswein et al. |
| 2019/0088971 A1* | 3/2019 | Koplow .............. H01M 8/143 |

FOREIGN PATENT DOCUMENTS

| | | |
|---|---|---|
| JP | 2002-252020 A | 9/2002 |
| JP | 2013-26142 A | 2/2013 |
| KR | 10-2013-0107845 A | 10/2013 |
| KR | 10-1367618 B1 | 3/2014 |
| KR | 10-2015-0046075 A | 4/2015 |
| KR | 10-2015-0095037 A | 8/2015 |
| KR | 10-1609907 B1 | 4/2016 |
| KR | 10-2016-0085113 A | 7/2016 |
| KR | 10-1732817 B1 | 5/2017 |

OTHER PUBLICATIONS

International Search Report (PCT/ISA/210) issued in PCT/KR2018/001760, dated May 21, 2018.

* cited by examiner

METHOD AND DEVICE FOR RECYCLING ELECTROLYTE OF FLOW BATTERY

TECHNICAL FIELD

The present specification application claims priority to and the benefits of Korean Patent Application No. 10-2017-0018784, filed with the Korean Intellectual Property Office on Feb. 10, 2017, the entire contents of which are incorporated herein by reference.

The present specification relates to a method for regenerating an electrolyte liquid of a flow battery and a device for regenerating an electrolyte liquid of a flow battery.

BACKGROUND ART

Power storage technology is an important technology for efficient use over the whole fields of energy such as efficiency of power use, enhancing ability or reliability of power supply systems, expanding introduction of new and renewable energy having large fluctuation depending on time, and energy regeneration of moving bodies, and its potential for development and demands for social contribution have gradually increased.

Studies on secondary batteries have been actively progressed in order for adjusting the balance of demand and supply in semi-autonomous regional power supply systems such as micro-grid, properly distributing non-uniform outputs of new and renewable energy generation such as wind power or solar power generation, and controlling impacts such as voltage and frequency changes occurring from differences with existing power systems, and expectations for the use of secondary batteries have increased in such fields.

When examining properties required for secondary batteries used for high capacity power storage, energy storage density needs to be high, and as high capacity and high efficiency secondary batteries mostly suited for such properties, flow batteries have recently received attention.

A flow battery is configured so as to place cathode and anode electrodes on both sides with a separator as a center.

Bipolar plates for electric conduction are each provided outside the electrodes, and the configuration comprises a cathode electrolyte liquid storage unit and an anode electrolyte liquid storage unit holding an electrolyte, an inlet to which the electrolyte goes into, and an outlet from which the electrolyte comes out again.

DISCLOSURE

Technical Problem

The present specification is directed to providing a method for regenerating an electrolyte liquid of a flow battery and a device for regenerating an electrolyte liquid of a flow battery.

Technical Solution

One embodiment of the present specification provides a method for regenerating an electrolyte liquid of a flow battery including operating a flow battery by repeated charging and discharging of the flow battery, wherein the flow battery which includes an anode, a cathode, a separator provided between the anode and the cathode, an anode electrolyte liquid storage unit supplying an anode electrolyte liquid to the anode and storing the anode electrolyte liquid discharged from the anode, and a cathode electrolyte liquid storage unit supplying a cathode electrolyte liquid to the cathode and storing the cathode electrolyte liquid discharged from the cathode; stopping the operation of the flow battery; mixing the anode electrolyte liquid and the cathode electrolyte liquid of the flow battery; electrically oxidizing or reducing the mixed electrolyte liquid; and dividing the oxidized or reduced electrolyte liquid into each of the cathode electrolyte liquid storage unit and the anode electrolyte liquid storage unit.

Another aspect of the present specification provides a device for regenerating an electrolyte liquid of a flow battery comprising a flow battery, which comprises an anode, a cathode, a separator provided between the anode and the cathode, an anode electrolyte liquid storage unit supplying an anode electrolyte liquid to the anode and storing the anode electrolyte liquid discharged from the anode, and a cathode electrolyte liquid storage unit supplying a cathode electrolyte liquid to the cathode and storing the cathode electrolyte liquid discharged from the cathode; and a flow battery includes a flow battery for regeneration including an anode cell; a cathode cell; a separator provided between the anode cell and the cathode cell; a mixed electrolyte liquid storage unit to which, after operating the flow battery through repeating charge and discharge and then stopping the operation of the flow battery, the anode electrolyte liquid and the cathode electrolyte liquid are introduced from the anode electrolyte liquid storage unit and the cathode electrolyte liquid storage unit and mixed; and an aqueous acid solution storage unit storing an aqueous acid solution including sulfuric acid, hydrochloric acid, nitric acid or a mixture thereof, and through the operation of the flow battery for regeneration, the electrolyte liquid mixed in the mixed electrolyte liquid storage unit is oxidized or reduced.

Advantageous Effects

The present specification has an advantage of recovering battery capacity by regenerating an electrolyte liquid of which performance declines due to a membrane permeation phenomenon and an unintended oxidation/reduction reaction.

The present specification has an advantage of recovering battery capacity even when the degree of ion imbalance of an electrolyte liquid is high.

REFERENCE NUMERAL

100: Upper System
101: Anode Electrolyte Liquid Storage Unit
102: Cathode Electrolyte Liquid Storage Unit
103: Anode Cell
103a: Anode Electrolyte Liquid
104: Cathode Cell
104a: Cathode Electrolyte Liquid
105: Separator
106: Pump
107: Three-way Valve
108: Mixed Electrolyte Liquid Storage Unit
109: Aqueous Acid Solution Storage Unit
110: Open Circuit Voltage Measuring Unit
200: Lower System

MODE FOR DISCLOSURE

The present specification relates to a method for regenerating an electrolyte liquid of a flow battery comprising an anode; a cathode; a separator provided between the anode and the cathode; an anode electrolyte liquid storage unit supplying an anode electrolyte liquid to the anode and storing the anode electrolyte liquid discharged from the anode; and a cathode electrolyte liquid storage unit supplying a cathode electrolyte liquid to the cathode and storing the cathode electrolyte liquid discharged from the cathode.

Figure 1:
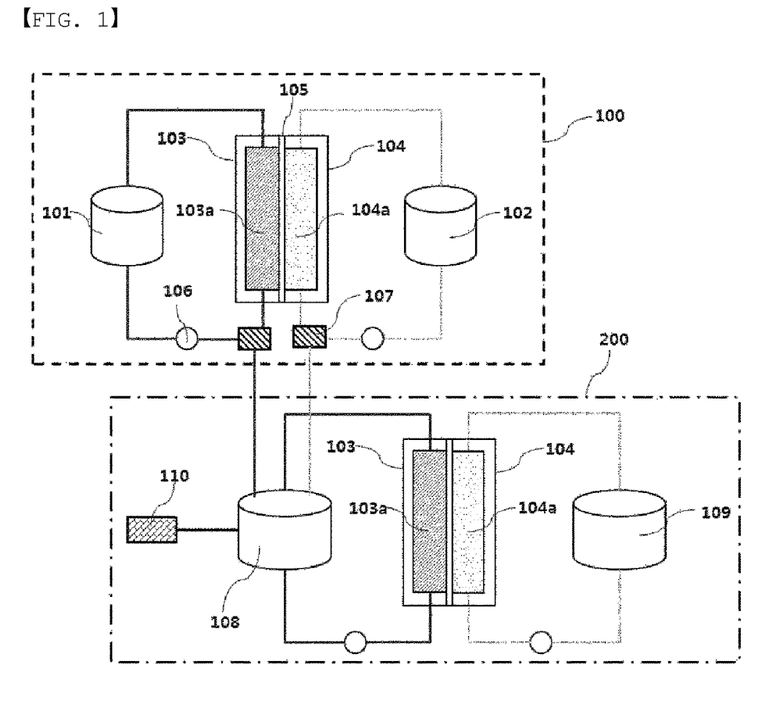
FIG. 1 illustrates a structure of a device for regenerating an electrolyte liquid of a flow battery according to one embodiment of the present specification.

FIG. 1 illustrates a structure of a device for regenerating an electrolyte liquid of a flow battery according to one embodiment of the present specification.

As illustrated in FIG. 1, the device for regenerating a flow battery electrolyte liquid according to one embodiment of the present specification is largely divided into two parts of an upper system (100) and a lower system (200).

The upper system of the device for regenerating a flow electrolyte liquid according to one embodiment of the present specification is divided into an anode cell (103) and a cathode cell (104) by a separator (105). The cathode cell and the anode cell comprise a cathode and an anode, respectively. The anode cell is connected to an anode electrolyte liquid storage unit (101) for supplying and discharging an anode electrolyte liquid (103a) through a pipe, and the cathode cell is connected to a cathode electrolyte liquid storage unit (102) for supplying and discharging a cathode electrolyte liquid (104a) through a pipe. The anode electrolyte liquid and the cathode electrolyte liquid circulate through a pump (106).

In the anode electrolyte liquid and the cathode electrolyte liquid of a flow battery operated for a long period of time, a decrease in the battery capacity becomes large due to a molar number imbalance and an oxidation number imbalance. When a decrease in the battery capacity of the upper system becomes large as above, a lower system of the device for regenerating a flow battery electrolyte liquid according to one embodiment of the present specification is operated.

Specifically, when only the upper system is operated, a three-way valve (107) connected to the pump of the upper system has an electrolyte liquid flowing only in a left and right direction. However, when the lower system is operated as well, the electrolyte liquid also flows to a mixed electrolyte liquid storage unit (108) of the lower system.

When the cathode electrolyte liquid and the anode electrolyte liquid introduced through the three-way valve are completely mixed by a stirrer installed inside the mixed electrolyte liquid storage unit, an open circuit voltage of the mixed electrolyte liquid is measured in an open circuit voltage (OCV) measuring unit (110) connected to the mixed electrolyte liquid storage unit.

The mixed electrolyte liquid is electrically oxidized or reduced until the measured open circuit voltage is within ±5% of a reference open circuit voltage. When the measured open circuit voltage becomes within ±5% of a reference open circuit voltage, oxidation number adjustment of the mixed electrolyte liquid is considered to be completed, and the mixed electrolyte liquid having the oxidation number adjustment completed is transferred to the cathode electrolyte liquid storage unit and the anode electrolyte liquid storage unit through the each three-way valve. Herein, the amount of the mixed electrolyte liquid transferred to the cathode electrolyte liquid storage unit and the anode electrolyte liquid storage unit through the each three-way valve is the same.

In addition, an aqueous acid solution storage unit (109) for producing an electrochemical oxidation (or reduction) reaction in the mixed electrolyte liquid storage unit may also be provided in the lower system.

Hereinafter, the present specification will be described in detail.

Materials of the separator are not particularly limited as long as it is capable of transferring ions, and those generally used in the art may be selected.

The separator may comprise a polymer having ion conductivity. The separator may be either formed with a polymer having ion conductivity, or provided with a polymer having ion conductivity in pores of the porous body.

The polymer having ion conductivity is not particularly limited as long as it is a material capable of exchanging ions, and those generally used in the art may be used.

The polymer having ion conductivity may be a hydrocarbon-based polymer, a partial fluorine-based polymer or a fluorine-based polymer.

The hydrocarbon-based polymer may be a hydrocarbon-based sulfonated polymer with no fluorine group, and on the contrary, the fluorine-based polymer may be a sulfonated polymer saturated with a fluorine group, and the partial fluorine-based polymer may be a sulfonated polymer that is not saturated with a fluorine group.

The polymer having ion conductivity may be one, two or more polymers selected from the group consisting of perfluorosulfonic acid-based polymers, hydrocarbon-based polymers, aromatic sulfone-based polymers, aromatic ketone-based polymers, polybenzimidazole-based polymers, polystyrene-based polymers, polyester-based polymers, polyimide-based polymers, polyvinylidene fluoride-based polymers, polyethersulfone-based polymers, polyphenylene sulfide-based polymers, polyphenylene oxide-based polymers, polyphosphazene-based polymers, polyethylene naphthalate-based polymers, polyester-based polymers, doped polybenzimidazole-based polymers, polyetherketone-based polymers, polyphenyl quinoxaline-based polymers, polysulfone-based polymers, polypyrrole-based polymers and polyaniline-based polymers. The polymer may be a single copolymer, an alternating copolymer, a random copolymer, a block copolymer, a multiblock copolymer or a graft copolymer, but is not limited thereto.

In addition, the polymer having ion conductivity may be a polymer having cation conductivity, and examples thereof may comprise at least one of Nafion, sulfonated polyetheretherketone (sPEEK), sulfonated (polyetherketone) (sPEK), poly(vinylidene fluoride)-graft-poly(styrene sulfonic acid) (PVDF-g-PSSA) and sulfonated poly(fluorenyletherketone).

The porous body is not particularly limited in the porous body structures and materials as long as it comprises a number of pores, and those generally used in the art may be used.

For example, the porous body may comprise at least one of polyimide (PI), Nylon, polyethylene terephthalate (PET), polytetrafluoroethylene (PTFE), polyethylene (PE), polypropylene (PP), poly(arylene ether sulfone) (PAES) and polyetheretherketone (PEEK).

The separator may have an average thickness of greater than or equal to 20 μm and less than or equal to 200 μm, however, the average thickness is not limited thereto.

The cathode means an electrode reduced by receiving electrons when discharged, and on the contrary, may perform a role of an anode (oxidation electrode) releasing electrons by the oxidation of a cathode active material when charging a battery.

The anode means an electrode releasing electrons by being oxidized when discharged, and on the contrary, may perform a role of a cathode (reduction electrode) reduced by receiving electrons when charging a battery.

The cathode and the anode each comprise a current collector; and porous carbon such as carbon felt provided between the current collector and a separator. The cathode means a region capable of charging and discharging electric energy by reacting while a cathode electrolyte liquid is injected and discharged from a cathode electrolyte liquid storage unit, and the anode means a region capable of charging and discharging electric energy by reacting while an anode electrolyte liquid is injected and discharged from an anode electrolyte liquid storage unit.

The cathode electrolyte liquid and the anode electrolyte liquid may comprise a cathode active material and an anode active material, respectively, as an electrolyte liquid active material. The cathode active material means a material reduced by receiving electrons when discharged and releasing electrons by being oxidized when charged, and the anode active material means a material releasing electrons by being oxidized when discharged, and reduced by receiving electrons when charged.

The electrolyte liquid active material of the flow battery may be metal ions having three or more types of different oxidation numbers, and for example, means, like vanadium ions, metal ions having three or more types of different oxidation numbers of $V^{2+}$, $V^{3+}$ and $V^{4+}$. Specifically, the electrolyte liquid active material of the flow battery may be any one of vanadium ions, titanium ions, chromium ions, manganese ions, iron ions, niobium ions, molybdenum ions, silver ions, tantalum ions and tungsten ions.

When the electrolyte liquid active material of the flow battery is vanadium ions, the cathode electrolyte liquid may comprise at least one of $V^{5+}$ and $V^{4+}$, and the anode electrolyte liquid may comprise at least one of $V^{2+}$ and $V^{3+}$. Theoretically, the electrolyte liquid active material of the vanadium flow battery forms an ion balance with an average oxidation number of 3.5 valency. Specifically, in a fully charged state (SOC: 100) of the flow battery, the cathode electrolyte liquid comprises $V^{5+}$ and the anode electrolyte liquid comprises $V^{2+}$, and in a fully discharged state (SOC: 0) of the flow battery, the cathode electrolyte liquid comprises $V^{4+}$ and the anode electrolyte liquid comprises $V^{3+}$.

The solvent is not particularly limited as long as it is capable of dissolving the electrolyte liquid active material, and examples thereof may comprise an aqueous sulfuric acid solution, an aqueous hydrochloric acid solution, an aqueous nitric acid solution and a mixed solution thereof.

A molar concentration of the acid in the aqueous sulfuric acid solution, the aqueous hydrochloric acid solution, the aqueous nitric acid solution or a mixed solution thereof may be greater than or equal to 1 M and less than or equal to 6 M. In other words, a molar number of the acid in 1 liter of the electrolyte liquid may be greater than or equal to 1 mol and less than or equal to 6 mol. Herein, the acid means sulfuric acid, hydrochloric acid, nitric acid or a mixture thereof, and the aqueous sulfuric acid solution, the aqueous hydrochloric acid solution, the aqueous nitric acid solution or a mixed solution thereof refers to adding sulfuric acid, hydrochloric acid, nitric acid or a mixture thereof, respectively, to water.

The flow battery may be divided according to the types of metal ions used as the electrolyte liquid active material, and the flow battery is not particularly limited as long as it uses metal ions having three or more types of different oxidation numbers as the electrolyte liquid active material.

The flow battery may be a vanadium flow battery. Specifically, the flow battery may be a vanadium flow battery in which a cathode electrolyte liquid comprises at least one of $V^{5+}$ and $V^{4+}$, and an anode electrolyte liquid comprises at least one of $V^{2+}$ and $V^{3+}$.

The present specification provides a battery module comprising the flow battery as a unit cell.

The battery module may be formed by inserting a bipolar plate between the flow batteries of the present specification, and stacking.

The battery module may specifically be used as a power supply of electric vehicles, hybrid electric vehicles, plug-in hybrid electric vehicles or power storage systems.

While the flow battery is operated through repeating charge and discharge, an electrolyte liquid active material, a solvent and the like comprised in an electrolyte liquid in any one electrode may permeate a separator and move to an opposite electrode. In this case, ion concentration and balance of redox ion species between both electrodes are destroyed causing a decrease in battery capacity and efficiency.

For example, in the vanadium flow battery, $V^{2+}$ and $V^{3+}$ of an anode electrolyte liquid permeate a separator in a higher rate compared to $V^{5+}$ and $V^{4+}$ of a cathode electrolyte liquid, and therefore, the amount of vanadium ions may increase in the cathode electrolyte liquid as a cycle progresses. Such a tendency predominantly occurs when using a cation separator, and the amount of vanadium ions of the anode electrolyte liquid may increase on the contrary depending on battery operating conditions, environments and the use of an anion separator. This generates a molar number imbalance between the cathode electrolyte liquid and the anode electrolyte liquid, and becomes a main cause of battery capacity decrease.

Another cause of battery capacity decrease is an average oxidation number imbalance between the cathode electrolyte liquid and the anode electrolyte liquid. In the vanadium flow battery, an average oxidation number of two electrolyte liquids is maintained at 3.5 while progressing charge and discharge of the battery in an ideal situation without a vanadium ion imbalance in the electrolyte liquids. However, due to unintended oxidation/and reduction reaction to describe below, an average oxidation number of the electrolyte liquids deviates from 3.5.

In the electrolyte liquid of the vanadium flow battery, a side reaction generating hydrogen ($2H^+ + 2e^- \rightarrow H_2$) may competitively occur at similar potential while a reduction reaction ($V^{3+}e^- \rightarrow V^{2+}$) occurs in the anode at the same time during charge. As a result, charge efficiency of the reduction reaction of the anode decreases, and more charge (oxidation reaction) occurs compared to the cathode making an increase in the oxidation number of the cathode larger than a decrease in the oxidation number of the anode, and the oxidation number of the mixed electrolyte liquid may increase compared to the theoretical balance oxidation number.

In addition, divalent vanadium ions ($V^{2+}$) of the anode meet with oxygen when brought into contact with the atmosphere and spontaneously cause an oxidation reaction during battery operation to produce trivalent vanadium ions ($V^{3+}$), and an oxidation number of the anode electrolyte liquid may increase therefrom.

The present specification relates to a method for regenerating an electrolyte liquid of a flow battery recovering molar number and oxidation number imbalances of redox ion species between both electrodes.

The present specification provides a method for regenerating an electrolyte liquid of a flow battery comprising operating a flow battery, which comprises an anode, a cathode, a separator provided between the anode and the cathode, an anode electrolyte liquid storage unit supplying an anode electrolyte liquid to the anode and storing the anode electrolyte liquid discharged from the anode, and a cathode electrolyte liquid storage unit supplying a cathode electrolyte liquid to the cathode and storing the cathode electrolyte liquid discharged from the cathode, through repeating charge and discharge, and then stopping the operation of the flow battery; mixing the anode electrolyte liquid and the cathode electrolyte liquid of the flow battery; electrically oxidizing or reducing the mixed electrolyte liquid; and dividing the oxidized or reduced electrolyte liquid into each of the cathode electrolyte liquid storage unit and the anode electrolyte liquid storage unit.

The method for regenerating an electrolyte liquid of a flow battery may comprise stopping the operation of the flow battery that is being operated through repeating charge and discharge.

The stopping of the operation of the flow battery is stopping the operation of the flow battery that is being operated through repeating charge and discharge two or more times, and specifically, may be stopping the operation of the flow battery that is being operated when the capacity decreases by 30% or greater compared to initial discharging capacity (mAh). In other words, the stopping of the operation of the flow battery may be stopping the operation of the flow battery having an ion imbalance between the electrolyte liquids by repeating charge and discharge two or more times.

The stopping of the operation of the flow battery may stop the operation of the flow battery that is being operated through repeating charge and discharge two or more times into a fully discharged state (SOC: 0).

For example, in the vanadium flow battery, the cathode electrolyte liquid may comprise $V^{4+}$ and the anode electrolyte liquid may comprise $V^{3+}$ after the stopping of the operation.

The fully discharged state (SOC: 0) of the vanadium flow battery is, theoretically, a state in which the anode electrolyte liquid in a fully discharged state comprises only $V^{3+}$, however, in an unbalanced state with relatively more ion amounts in the cathode electrolyte liquid, vanadium ions (any one of $V^{2+}$ and $V^{3+}$) of the anode electrolyte liquid permeate a separator and provide electrons to $V^{5+}$ of the cathode electrolyte liquid during battery operation, and some of $V^{5+}$ of the cathode electrolyte liquid may be reduced to $V^{4+}$. On the contrary, the cathode electrolyte liquid in a fully discharged state comprises only $V^{4+}$, however, in an unbalanced state with relatively more ion amounts in the anode electrolyte liquid, vanadium ions (any one of $V^{4+}$ and $V^{5+}$) of the cathode electrolyte liquid permeate a separator and take away electrons of $V^{2+}$ of the anode electrolyte liquid during battery operation, and some of $V^{2+}$ may be oxidized to $V^{3+}$ and permeated $V^{5+}$ may be reduced to $V^{4+}$.

The method for regenerating an electrolyte liquid of a flow battery comprises, after stopping the operation of the flow battery, mixing the anode electrolyte liquid and the cathode electrolyte liquid of the flow battery.

The mixing may mean the anode electrolyte liquid stored in the anode electrolyte liquid storage unit and the cathode electrolyte liquid stored in the cathode electrolyte liquid storage unit being mixed in a mixed electrolyte liquid storage unit.

When stopping the flow battery in a fully discharged state (SOC: 0) in the mixing, metal ions comprised in the electrolyte liquids haves metal ions with an oxidation number in a fully discharged state being mixed in the same amount in an ideal case (when there is no electrolyte liquid ion imbalance). Accordingly, metal ions having different oxidation numbers of the mixed electrolyte liquid may maintain an initial average oxidation number of the reaction without an additional oxidation or reduction reaction.

However, when there is an electrolyte liquid ion imbalance, metal ions having oxidation numbers different from the metal ions having oxidation numbers in a fully discharged state become present.

For example, when mixing the cathode electrolyte liquid comprising only $V^{4+}$ and the cathode electrolyte liquid comprising only $V^{3+}$ in a fully discharged state (SOC: 0) of the vanadium flow battery, $V^{3+}$ and $V^{4+}$ may maintain an average oxidation number of 3.5 valency in the mixed electrolyte liquid without an additional oxidation or reduction reaction.

However, when membrane permeation of the electrolyte liquid and unintended oxidation/reduction side reactions occur during the operation of the flow battery, metal ions having oxidation numbers ($V^{2+}$ and $V^{5+}$) different from the metal ions having oxidation numbers in a fully discharged state ($V^{3+}$ and $V^{4+}$) are present, and a mixed electrolyte liquid having an average oxidation number deviating from 3.5 valency is made.

On this, the method for regenerating an electrolyte liquid of a flow battery according to one embodiment of the present specification may resolve a molar number imbalance of the electrolyte liquid by comprising mixing the anode electrolyte liquid and the cathode electrolyte liquid of the flow battery after stopping the operation of the flow battery. However, the additional oxidation or reduction reaction between $V^{2+}$ and $V^{5+}$ is a 1:1 reaction, and therefore, when a molar number of $V^{2+}$ and a molar number of $V^{5+}$ present in the mixed electrolyte liquid are different, ions with a larger molar number among $V^{2+}$ and $V^{5+}$ remain even after progressing the additional oxidation or reduction reaction by the mixing. Accordingly, the oxidation number imbalance may not be resolved just by such mixing of the anode electrolyte liquid and the cathode electrolyte liquid.

In view of the above, the method for regenerating an electrolyte liquid of a flow battery comprises, after the mixing of the anode electrolyte liquid and the cathode electrolyte liquid of the flow battery, oxidizing or reducing the mixed electrolyte liquid.

The oxidizing or reducing of the mixed electrolyte liquid is electrically reducing the mixed electrolyte liquid when the mixed electrolyte liquid has an average oxidation number of greater than 3.5, and electrically oxidizing the mixed electrolyte liquid when the mixed electrolyte liquid has an average oxidation number of less than 3.5.

The average oxidation number being 3.5 means that, for example, $V^{3+}$ and $V^{4+}$ are mixed and present in a ratio of 1:1 in the mixed electrolyte liquid. When the average oxidation number is 3.5 as above, the flow battery may exhibit maximum capacity.

When electrically reducing the mixed electrolyte liquid, the mixed electrolyte liquid may be electrically reduced by, using an oxidation/reduction device comprising a reduction electrode, an oxidation electrode, and a separator provided between the reduction electrode and the oxidation electrode, filling a side separated by the separator and provided with the reduction electrode with the mixed electrolyte liquid; filling a side separated by the separator and provided with the oxidation electrode with an aqueous acid solution comprising sulfuric acid, hydrochloric acid, nitric acid or a mixture thereof; and operating the oxidation/reduction device.

The mixed electrolyte liquid on the side provided with the reduction electrode and the aqueous acid solution on the side provided with the oxidation electrode may be in equal volumes theoretically when filled. Herein, the volume may be different by an error range of volume measurement, and the volumes within the error range are considered to be the same.

The mixed electrolyte liquid comprises an acid comprising sulfuric acid, hydrochloric acid, nitric acid or a mixture thereof, and the acid concentration of the mixed electrolyte liquid on the side provided with the reduction electrode and the acid concentration of the aqueous acid solution on the side provided with the reference electrode may be theoretically the same as each other. Herein, the concentration may be different by an error range of volume measurement, and the concentrations within the error range are considered to be the same.

When electrically oxidizing the mixed electrolyte liquid, the mixed electrolyte liquid may be electrically oxidized by, using an oxidation/reduction device comprising a reduction electrode, an oxidation electrode, and a separator provided between the reduction electrode and the oxidation electrode, filling a side separated by the separator and provided with the oxidation electrode with the mixed electrolyte liquid; filling a side separated by the separator and provided with the reduction electrode with an aqueous acid solution comprising sulfuric acid, hydrochloric acid, nitric acid or a mixture thereof; and operating the oxidation/reduction device.

As the material of the reduction electrode, various electrode materials generally used in flow batteries may be used, and electrodes made of carbon materials are commonly preferred.

As the material of the oxidation electrode, a dimensionally stable anode (DSA, insoluble electrode) having strong corrosion resistance for an oxidation reaction is used. For example, a platinum-coated titanium electrode may be used, however, the material is not limited thereto.

The oxidizing or reducing may comprise 1) electrically oxidizing or reducing the mixed electrolyte liquid; 2) measuring an open circuit voltage (OCV) of the oxidized or reduced electrolyte liquid; and 3) repeating 1) and 2) until the measured open circuit voltage is within ±5% of a reference open circuit voltage when comparing with the reference open circuit voltage.

An open circuit voltage measuring unit measuring the open circuit voltage may be formed with a potentiostat connected to a working electrode and a reference electrode. As the working electrode material, carbon bodies such as glassy carbon, or acid resistant precious metals such as Pt and Au may be used, and as the reference electrode material, Ag/AgCl, $Hg/Hg_2Cl_2$, $Hg/HgO$, $Hg/Hg_2SO_4$, $Ag/Ag_2SO_4$, $Cu/CuSO_4$, $Ag/Ag^+$ and the like may be used, however, the materials are not limited thereto.

The open circuit voltage measuring unit may comprise an OCV measuring electrode measuring an open circuit voltage, and a display unit connected to the OCV measuring electrode and provided outside the mixed electrolyte liquid storage unit, but is not limited thereto, and generally used OCV measuring devices may be used.

Repeating 1) and 2) until the measured open circuit voltage is within ±5% of a reference open circuit voltage when comparing with the reference open circuit voltage is specifically as follows. When the measured open circuit voltage is different from the reference open circuit voltage by ±5% or greater, a constant current is supplied, and as the difference between the measured open circuit voltage and the reference open circuit voltage decreases, a supplied current is gradually reduced, and as a result, the oxidation or reduction reaction may be progressed so that the measured open circuit voltage becomes within ±5% of the reference open circuit voltage.

Specifically, the open circuit voltage of the reference electrolyte liquid is input to the potentiostat, and the mixed electrolyte liquid is reduced or oxidized by operating a lower system until the open circuit voltage value of the mixed electrolyte liquid becomes within ±5% of the reference open circuit voltage. When the open circuit voltage value of the mixed electrolyte liquid is within ±5% of the reference open circuit voltage, the reaction is terminated.

Herein, the reference open circuit voltage means an open circuit voltage of a 3.5 valent solution (solution mixing tetravalent and trivalent solutions in 1:1) of the electrolyte liquid having the same electrolyte liquid active material concentration and acid concentration as the electrolyte liquid requiring regeneration (electrolyte liquid with broken oxidation number balance).

The oxidizing or reducing may comprise measuring an average oxidation number of the mixed electrolyte liquid; calculating theoretical charge quantity required to change the measured average oxidation number to an average oxidation number of 3.5 valency; and electrically oxidizing or reducing the mixed electrolyte liquid by adding the calculated charge quantity to the mixed electrolyte liquid.

The theoretical charge quantity required to change the measured average oxidation number to an average oxidation number of 3.5 valency may be calculated through the following Equation 1.

$$Q = \Delta n F C V \qquad \text{[Equation 1]}$$

Q: charge quantity (unit C, Coulomb)
$\Delta n$: average oxidation number of electrolyte liquid having oxidation number imbalance-target oxidation number (3.5)
F: Faraday constant 96485.3 (unit, C/mole)
C: active material (ex. vanadium) concentration in electrolyte liquid (unit, mole/L)
V: volume of electrolyte liquid (unit, L)

For example, assuming that the oxidation number of the mixed electrolyte liquid (100 mL) having an oxidation number imbalance is measured at 3.8 valency and the vanadium concentration of this electrolyte liquid is 1.6 mole/L, charge quantity required to make the average oxidation number to 3.5 valency, an average oxidation number of the present specification is as follows.

$$Q=(3.8-3.5)*(96485.3 C/\text{mole})*(1.6\text{ mole})*(0.1 L)=4631.3 C$$

In other words, assuming that current efficiency is 100%, the oxidation number changes to 3.5 valency when reducing the electrolyte liquid by a charge quantity of 4631.3 C.

Charge quantity (Q) calculated as in the following Equation 2 is a product of time and current, and therefore, the mixed electrolyte liquid may be oxidized or reduced by applying the calculated charge quantity to the mixed electrolyte liquid after determining a current quantity to supply to the mixed electrolyte liquid and a supply time resulted therefrom.

$$Q=It \quad \text{[Equation 2]}$$

In Equation 2, Q is charge quantity, I is a current, and t is a supply time of the current.

In the present specification, the oxidation number of the electrolyte liquid may be measured by potentiometric titration using a $KMnO_4$ oxidizer, and specifically, may be calculated through the following Equation 3.

$$\text{Oxidation Number} = \left(5 - \frac{n \times C_K V_K}{C_V V_V}\right) = \left(5 - \frac{5 \times C_K M_k}{C_V V_V d_K}\right) = \left(5 - \frac{0.099106 \times M_K}{C_V}\right) \quad \text{[Equation 3]}$$

$V_K$: introduced volume of $KMnO_4$ titrant (mL)
$C_K$: concentration of $KMnO_4$ titrant (=0.1 mol/L)
$V_V$: volume of vanadium solution (=5.03 mL)
$C_V$: concentration of vanadium solution (mol/L)
n: electron molar number consumed per 1 mol of $KMnO_4$ (=5)
$M_K$: introduced mass of $KMnO_4$ titrant (g)
$d_k$: density of $KMnO_4$ titrant (=1.003 g/mol)

In the method for regenerating an electrolyte liquid of a flow battery, the oxidized or reduced electrolyte liquid may be divided into each of the cathode electrolyte liquid storage unit and the anode electrolyte liquid storage unit.

Herein, each electrolyte liquid filled in the cathode electrolyte liquid storage unit and the anode electrolyte liquid storage unit may be divided into equal volumes. Herein, the volume may be different by an error range of volume measurement, and the volumes within the error range are considered to be the same.

The method for regenerating an electrolyte liquid of a flow battery may further comprise, after the dividing, re-operating the flow battery. Specifically, metal ions comprised in the electrolyte liquid are in a state where metal ions in a fully discharged state are mixed with each other after the dividing, and therefore, the re-operating of the flow battery may be charging the flow battery first, and then operating through repeating charge and discharge.

When the flow battery is a vanadium battery, metal ions comprised in the electrolyte liquid are in a state where $V^{4+}$ and $V^{3+}$ in a fully discharged state are mixed with each other after the dividing, and therefore, the re-operating of the flow battery may be charging the flow battery first, and then operating through repeating charge and discharge.

The present specification provides a device for regenerating an electrolyte liquid of a flow battery comprising an anode, a cathode, a separator provided between the anode and the cathode, an anode electrolyte liquid storage unit supplying an anode electrolyte liquid to the anode and storing the anode electrolyte liquid discharged from the anode, and a cathode electrolyte liquid storage unit supplying a cathode electrolyte liquid to the cathode and storing the cathode electrolyte liquid discharged from the cathode.

The device for regenerating an electrolyte liquid of a flow battery comprises a flow battery for regeneration comprising an anode cell; a cathode cell; a separator provided between the anode cell and the cathode cell; a mixed electrolyte liquid storage unit to which, after operating the flow battery through repeating charge and discharge and then stopping the operation of the flow battery, the anode electrolyte liquid and the cathode electrolyte liquid are introduced from the anode electrolyte liquid storage unit and the cathode electrolyte liquid storage unit and mixed; and an aqueous acid solution storage unit storing an aqueous acid solution comprising sulfuric acid, hydrochloric acid, nitric acid or a mixture thereof, and through the operation of the flow battery for regeneration, the electrolyte liquid mixed in the mixed electrolyte liquid storage unit is oxidized or reduced.

The device for regenerating an electrolyte liquid of a flow battery may cite the descriptions provided above on the method for regenerating an electrolyte liquid of a flow battery.

By operating the flow battery for regeneration, the electrolyte liquid mixed in the mixed electrolyte liquid storage unit is supplied to the anode cell or the cathode cell, the oxidized or reduced electrolyte liquid is discharged to the mixed electrolyte liquid storage unit from the mixed electrolyte liquid-supplied anode cell or cathode cell, and, to the opposite cell among the anode cell and the cathode cell to which the mixed electrolyte liquid is not supplied, the aqueous acid solution is supplied from the aqueous acid solution storage unit, and the aqueous acid solution may be discharged to the aqueous acid solution storage unit from the aqueous acid solution-supplied anode cell or cathode cell.

The aqueous acid solution storage unit is an electrolyte liquid for producing, when an electrochemical reduction (or oxidation) reaction occurs in the mixed electrolyte liquid storage unit, an electrochemical oxidation (or reduction) reaction opposed thereto. An oxidation reaction of water generally occurs in the aqueous acid solution storage unit, and as the cathode (oxidation electrode), using materials resistant to corrosion and readily producing an oxidation reaction is preferred so that the reaction favorably occurs. For example, DSA electrode materials such as Pt coated on Ti, or Ru, Ir, coated Ti may be used, however, the material is not limited thereto.

The aqueous acid solution comprises sulfuric acid, hydrochloric acid, nitric acid or a mixture thereof, and refers to adding sulfuric acid, hydrochloric acid, nitric acid or a mixture thereof to water. A molar concentration of the acid in the aqueous acid solution may be greater than or equal to 1 M and less than or equal to 6 M. In other words, a molar number of the acid in 1 liter of an aqueous solution may be greater than or equal to 1 mol and less than or equal to 6 mol.

The mixed electrolyte liquid comprises an acid comprising sulfuric acid, hydrochloric acid, nitric acid or a mixture thereof, and a concentration of the acid in the aqueous acid solution of the aqueous acid solution storage unit may be theoretically the same as a sum of the concentration of the acid of the mixed electrolyte liquid and the concentration of the electrolyte liquid active material. When considering an error range of the concentration, the concentration of the acid in the aqueous acid solution of the aqueous acid solution storage unit may be the same as or similar to the concentration of the acid of the mixed electrolyte liquid, and specifically, the concentration of the acid in the aqueous acid solution may be greater than or equal to 80% and less than or equal to 120% with respect to a sum of the concentration of the acid of the mixed electrolyte liquid and the concentration of the electrolyte liquid active material.

Hereinafter, the present specification will be described in more detail with reference to examples. However, the following examples are for illustrative purposes only, and not to limit the present specification.

EXAMPLE

Example 1

1 M $VOSO_4$ was introduced to a 3 M aqueous $H_2SO_4$ solution to prepare 200 ml of a raw electrolyte liquid. Using the raw electrolyte liquid, an unbalanced electrolyte liquid was obtained by operating a flow battery through charging/discharging 400 times or more.

After mixing the unbalanced electrolyte liquids obtained from both side electrodes of the flow battery, the mixed electrolyte liquid was electrically reduced using an H-cell.

Herein, the H-cell is a glass device having two compartments divided by a separator in the center, and a volume of each compartment is approximately 200 mL. 180 ml of the mixed electrolyte liquid was introduced to any one of the compartments, and 180 ml of a 4 M aqueous sulfuric acid ($H_2SO_4$) solution was introduced to the remaining compartment.

Nafion115 was used as the separator, and to platinum-coated cylindrical titanium mesh (Ti mesh) electrodes each provided in the two compartments, a current was applied.

A real-time open circuit voltage (OCV) of the mixed electrolyte liquid was measured while reducing the mixed electrolyte liquid by applying a current to the titanium mesh (Ti mesh)-coated cylindrical platinum electrodes. The current for reduction was controlled while comparing the measured OCV value with 0.364 V, an OCV value of a reference electrolyte liquid (1 M vanadium electrolyte liquid of 3.5 valency), and a regenerated electrolyte liquid was prepared by employing the measured OCV value to reach the OCV value of the reference electrolyte liquid.

Herein, in order to measure the real-time open circuit voltage (OCV) of the mixed electrolyte liquid, glassy carbon was used as a working electrode and Ag/AgCl was used as a reference electrode.

Example 2

1.6 M $VOSO_4$ was introduced to a 2.0 M aqueous $H_2SO_4$ solution to prepare 200 ml of a raw electrolyte liquid. Using the raw electrolyte liquid, an unbalanced electrolyte liquid was obtained by operating a flow battery through charging/discharging 200 times or more.

Figure 2:
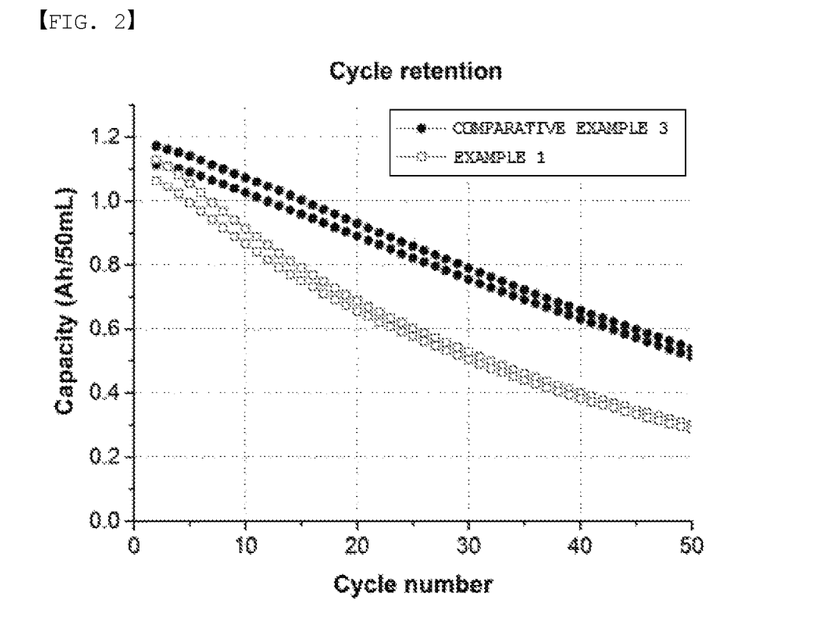
FIG. 2 is a graph evaluating battery capacity obtained by using each of an electrolyte liquid of Example 1 that is a regenerated electrolyte liquid, and an electrolyte liquid of Comparative Example 3 in an end cell.

After mixing the unbalanced electrolyte liquid obtained from both side electrodes of the flow battery, the result was used in a flow battery end cell for regenerating an electrolyte liquid as in FIG. 2 to electrically reduce the mixed electrolyte liquid. Herein, a 3.6 M aqueous sulfuric acid solution was used as a counter solution, Nafion115 was used as a separator, a Pt/Ti DSA electrode was used as a cathode, and carbon felt was used as an anode.

In order to measure a real-time open circuit voltage (OCV) on the electrolyte liquid side mixed for regenerating the electrolyte liquid, glassy carbon was installed as a working electrode and Ag/AgCl was installed as a reference electrode.

A real-time open circuit voltage (OCV) of the mixed electrolyte liquid was measured while reducing the mixed electrolyte liquid by applying a current to the cathode and the anode. The current for reduction was controlled while comparing the measured OCV value with 0.267 V, an OCV value of a reference electrolyte liquid (1.6 M vanadium 2.0 M sulfuric acid electrolyte liquid of 3.5 valency), and a regenerated electrolyte liquid was prepared by employing the measured OCV value to reach the OCV value of the reference electrolyte liquid.

Experimental Example 1

Electrolyte Liquid Component Analysis

An oxidation number of the electrolyte liquid of Example 1 was measured by potentiometric titration using a $KMnO_4$ oxidizer, and an OCV was measured using glassy carbon, a working electrode, and Ag/AgCl, a reference electrode.

In addition, the hydrogen ion concentration was measured through an acid-base titration method using a 1 N NaOH standard solution, the vanadium ion concentration was measured by inductively coupled plasma atomic emission spectroscopy (ICP-AES), and the results are shown in the following Table 1.

TABLE 1

| | Oxidation Number (n) | OCV (V vs Ag/AgCl) | Hydrogen Ion Concentration/ 2 ([H+]/2) | Vanadium Concentration (Molar Concentration, M) |
|---|---|---|---|---|
| Example 1 | 3.57 | 0.378 | 2.69 | 1 |
| Comparative Example 1 | 4.10 | 0.860 | 3.13 | 1 |
| Comparative Example 2 | 3.99 | 0.715 | 3.10 | 1 |
| Comparative Example 3 | 3.49 | 0.364 | 2.75 | 1 |
| Comparative Example 4 | 3.03 | 0.350 | 2.35 | 1 |

\* Comparative Example 1: unbalanced electrolyte liquid obtained by driving a flow battery before regenerating an electrolyte liquid in Example 1
\* Comparative Example 2: aqueous tetravalent vanadium ion reference solution comprising 1M vanadium ions and 3M hydrogen ions (1V3H) without being used in a battery
\* Comparative Example 3: aqueous 3.5 valent vanadium ion reference solution comprising 1M vanadium ions and 3M hydrogen ions (1V3H) without being used in a battery
\* Comparative Example 4: aqueous trivalent vanadium ion reference solution comprising 1M vanadium ions and 3M hydrogen ions (1V3H) without being used in a battery As shown in Table 1, it was seen that an average oxidation number of the electrolyte liquid regenerated in Example 1 nearly reached 3.5. Specifically, Example 1 is an electrolyte liquid regenerating the electrolyte liquid of Comparative Example 1 with an oxidation number imbalance through the method for regenerating an electrolyte liquid of a flow battery according to one embodiment of the present specification. It was identified that, through the method for regenerating an electrolyte liquid of a flow battery according to one embodiment of the present specification, the oxidation number changed from 4.10 to 3.57.

An oxidation number of the electrolyte liquid of Example 2 was measured by potentiometric titration using a $KMnO_4$ oxidizer, and an OCV was measured using glassy carbon, a working electrode, and Ag/AgCl, a reference electrode.

In addition, the hydrogen ion concentration was measured through an acid-base titration method using a 1 N NaOH standard solution, the vanadium ion concentration was measured by inductively coupled plasma atomic emission spectroscopy (ICP-AES), and the results are shown in the following Table 2.

TABLE 2

|  | Oxidation Number (n) | OCV (V vs Ag/AgCl) | Hydrogen Ion Concentration/ 2 ([H$^+$]/2) | Vanadium Concentration (Molar Concentration, M) |
|---|---|---|---|---|
| Example 2 | 3.53 | 0.265 | 2.05 | 1.6 |
| Comparative Example 5 | 4.03 | 0.850 | 2.61 | 1.6 |
| Comparative Example 6 | 3.98 | 0.675 | 1.91 | 1.6 |
| Comparative Example 7 | 3.43 | 0.267 | 1.91 | 1.6 |
| Comparative Example 8 | 2.99 | 0.158 | 0.90 | 1.6 |

* Comparative Example 5: unbalanced electrolyte liquid obtained by driving a flow battery before regenerating an electrolyte liquid in Example 2
* Comparative Example 6: aqueous tetravalent vanadium ion reference solution comprising 1.6M vanadium ions and 2M hydrogen ions (1.6V2H) without being used in a battery
* Comparative Example 7: aqueous 3.5 valent vanadium ion reference solution comprising 1.6M vanadium ions and 2M hydrogen ions (1.6V2H) without being used in a battery
* Comparative Example 8: aqueous trivalent vanadium ion reference solution comprising 1.6M vanadium ions and 2M hydrogen ions (1.6V2H) without being used in a battery As shown in Table 2, it was seen that an average oxidation number of the electrolyte liquid regenerated in Example 2 nearly reached 3.5. Specifically, Example 2 is an electrolyte liquid regenerating the electrolyte liquid of Comparative Example 5 with an oxidation number imbalance through the method for regenerating an electrolyte liquid of a flow battery according to one embodiment of the present specification. It was identified that, through the method for regenerating an electrolyte liquid of a flow battery according to one embodiment of the present specification, the oxidation number changed from 4.03 to 3.53.

Experimental Example 2

Battery Performance Measurement

The electrolyte liquids of Examples 1 and 2 that are regenerated electrolyte liquids, and the electrolyte liquids of Comparative Examples 3 and 7 were each used in an end cell, and performance thereon was evaluated. The results are shown in the following Table 3, and FIG. 2 to FIG. 5.

Herein, the charge/discharge condition of the end cell comprised a 5 cm×5 cm carbon felt electrode, a Nafion115 separator, a 25 cc/min flow rate, 50 mA/cm$^2$ current density and a 0.8 V to 1.7 V voltage.

TABLE 3

|  | Initial Discharging Capacity (Based on 50 cm$^3$, Ah) | Average Efficiency (2$^{nd}$ to 50$^{th}$ cycle, %) | | |
|---|---|---|---|---|
|  |  | Current | Voltage | Energy |
| Example 1 | 1.07 | 95.3 | 91.0 | 86.7 |
| Comparative Example 3 | 1.11 | 95.7 | 89.5 | 85.6 |
| Example 2 | 1.99 | 93.7 | 85.9 | 80.6 |
| Comparative Example 7 | 2.00 | 95.0 | 88.7 | 84.3 |

Figure 3:
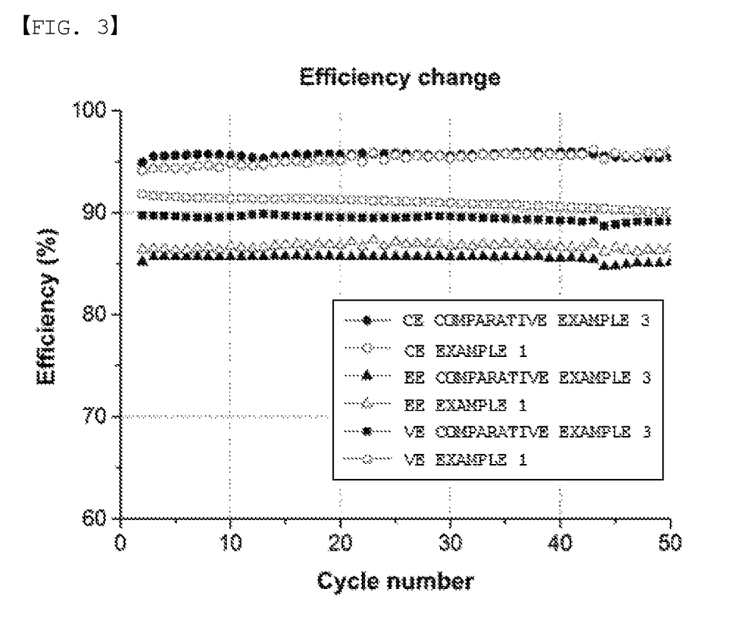
FIG. 3 is a graph presenting battery efficiency obtained by using each of an electrolyte liquid of Example 1 that is a regenerated electrolyte liquid, and an electrolyte liquid of Comparative Example 3 in an end cell.

As shown in Table 3, FIG. 2 and FIG. 3, it was seen that Example 1, an electrolyte liquid generated using the method for regenerating an electrolyte liquid of a flow battery of the present specification, had 96.7% of the capacity recovered compared to Comparative Example 3, and capacity retention somewhat decreased. Specifically, it was seen that the current slightly decreased, however, the voltage and the energy slightly increased compared to Comparative Example 3.

Figure 4:
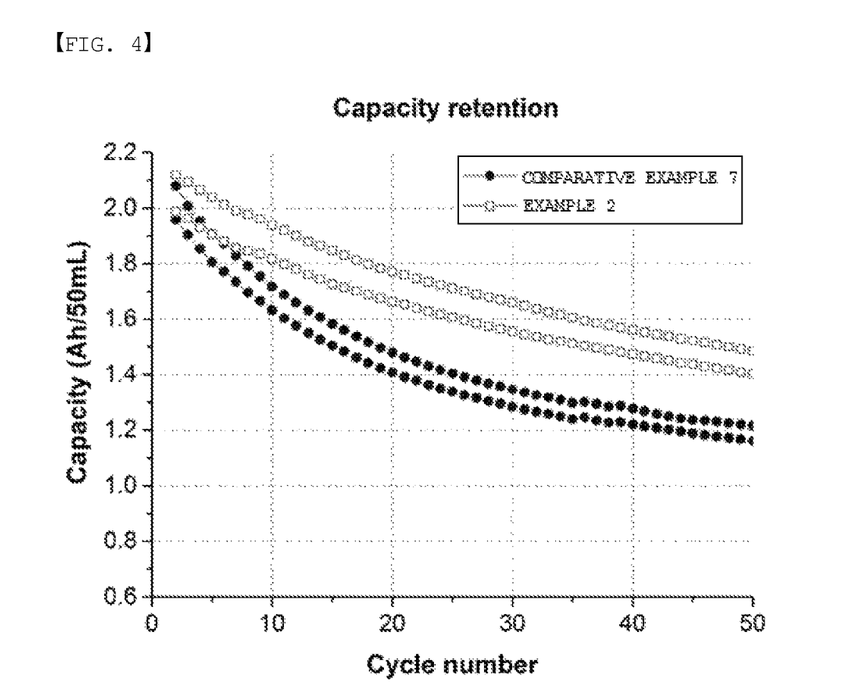
FIG. 4 is a graph evaluating battery capacity obtained by using each of an electrolyte liquid of Example 2 that is a regenerated electrolyte liquid, and an electrolyte liquid of Comparative Example 7 in an end cell.
Figure 5:
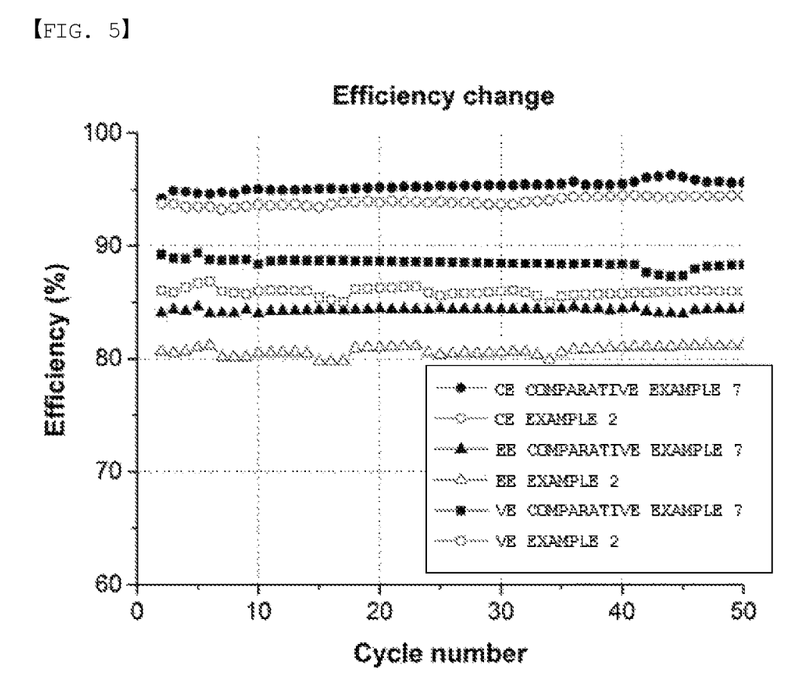
FIG. 5 is a graph presenting battery efficiency obtained by using each of an electrolyte liquid of Example 2 that is a regenerated electrolyte liquid, and an electrolyte liquid of Comparative Example 7 in an end cell.

Through Table 3, FIG. 4 and FIG. 5, it was seen that Example 2, an electrolyte liquid regenerated using the method for regenerating an electrolyte liquid of a flow battery of the present specification, had initial discharging capacity recovering to almost the same initial capacity level compared to Comparative Example 7, and capacity cycle retention was more superior compared to Comparative Example 7. However, Example 2 had somewhat decreased current, voltage and energy efficiency compared to Comparative Example 7.

Hereinbefore, the present disclosure has been described with reference to preferred embodiments, however, the present disclosure is not limited thereto, and various modifications may be implemented within the claims and the detailed descriptions of the invention, and these also belong to the category of the disclosure.

The invention claimed is:

1. A method for regenerating an electrolyte liquid of a flow battery comprising:
   providing the flow battery, wherein the flow battery comprises:
      an anode,
      a cathode,
      a separator provided between the anode and the cathode,
      an anode electrolyte liquid storage unit that supplies an anode electrolyte liquid to the anode and that stores the anode electrolyte liquid that is discharged from the anode, and
      a cathode electrolyte liquid storage unit that supplies a cathode electrolyte liquid to the cathode and that stores the cathode electrolyte liquid that is discharged from the cathode;
   charging and discharging of the flow battery repeatedly to generate an unbalanced anode electrolyte liquid and an unbalanced cathode electrolyte liquid;
   stopping an operation of the flow battery;
   mixing the unbalanced anode electrolyte liquid and the unbalanced cathode electrolyte liquid to produce a mixed electrolyte liquid;
   electrically oxidizing or reducing the mixed electrolyte liquid to produce a regenerated electrolyte liquid; and
   dividing the regenerated electrolyte liquid into each of the cathode electrolyte liquid storage unit and the anode electrolyte liquid storage unit.

2. The method for regenerating the electrolyte liquid of the flow battery of claim 1, wherein the anode electrolyte liquid and the cathode electrolyte liquid of the flow battery comprise an active material that is a metal ion having three or more different oxidation numbers.

3. The method for regenerating the electrolyte liquid of the flow battery of claim 2, wherein the active material is selected from the group consisting of vanadium ions, titanium ions, chromium ions, manganese ions, iron ions, niobium ions, molybdenum ions, silver ions, tantalum ions and tungsten ions.

4. The method for regenerating the electrolyte liquid of the flow battery of claim 1, wherein, after the stopping of the operation of the flow battery, the cathode electrolyte liquid includes V$^{4+}$ and the anode electrolyte liquid includes V$^{3+}$.

5. The method for regenerating the electrolyte liquid of the flow battery of claim 4, wherein the oxidizing or reducing electrically reduces the mixed electrolyte liquid when the mixed electrolyte liquid has an average oxidation number of greater than 3.5, and electrically oxidizes the mixed electrolyte liquid when the mixed electrolyte liquid has an average oxidation number of less than 3.5.

6. The method for regenerating the electrolyte liquid of the flow battery of claim 1, wherein the oxidizing or reducing includes 1) electrically oxidizing or reducing the mixed electrolyte liquid; 2) measuring an open circuit voltage (OCV) of the regenerated electrolyte liquid; and 3) repeating 1) and 2) until the measured open circuit voltage is within ±5% of a reference open circuit voltage when comparing with the reference open circuit voltage.

7. The method for regenerating the electrolyte liquid of the flow battery of claim 4, wherein the oxidizing or reducing includes measuring an average oxidation number of the mixed electrolyte liquid; calculating a charge quantity required to change the measured average oxidation number to an average oxidation number of 3.5 valency; and electrically oxidizing or reducing the mixed electrolyte liquid by adding the calculated charge quantity to the mixed electrolyte liquid.

8. The method for regenerating the electrolyte liquid of the flow battery of claim 1, further comprising, after the dividing, operating the flow battery again.

9. A device for regenerating an electrolyte liquid of a flow battery comprising
1) a first flow battery, which comprises:
    a first anode;
    a first cathode;
    a first separator provided between the first anode and the first cathode;
    an anode electrolyte liquid storage unit that supplies a first anode electrolyte liquid to the first anode and that stores the first anode electrolyte liquid that is discharged from the first anode;
    a cathode electrolyte liquid storage unit that supplies a cathode electrolyte liquid to the first cathode and that stores the cathode electrolyte liquid that is discharged from the first cathode; and
2) a second flow battery for regeneration, which comprises
    a second anode cell;
    a second cathode cell;
    a second separator provided between the second anode cell and the second cathode cell;
    a mixed electrolyte liquid storage unit to which, after operating the first flow battery through repeating charge and discharge and then stopping an operation of the first flow battery, the first anode electrolyte liquid and the cathode electrolyte liquid are introduced from the anode electrolyte liquid storage unit and the cathode electrolyte liquid storage unit and mixed to produce a mixed electrolyte liquid; and
    an aqueous acid solution storage unit storing an aqueous acid solution comprising sulfuric acid, hydrochloric acid, nitric acid or a mixture thereof,
    wherein through an operation of the second flow battery for regeneration, the mixed electrolyte liquid in the mixed electrolyte liquid storage unit is converted to a regenerated electrolyte liquid.

10. The device for regenerating the electrolyte liquid of the flow battery of claim 9, wherein the mixed electrolyte liquid storage unit is provided with an open circuit voltage measuring unit measuring an open circuit voltage of the mixed electrolyte liquid.

11. The device for regenerating the electrolyte liquid of the flow battery of claim 9, wherein the mixed electrolyte liquid further includes an acid including sulfuric acid, hydrochloric acid, nitric acid or a mixture thereof, and an electrolyte liquid active material, and a concentration of the acid in the aqueous acid solution in the aqueous acid solution storage unit is greater than or equal to 80% and less than or equal to 120% with respect to a sum of a concentration of the acid of the mixed electrolyte liquid and a concentration of the electrolyte liquid active material.

* * * * *